March 24, 1959 H. J. KLOTZ ET AL 2,879,331
DECODING ANALYZER
Filed May 19, 1955 5 Sheets-Sheet 1
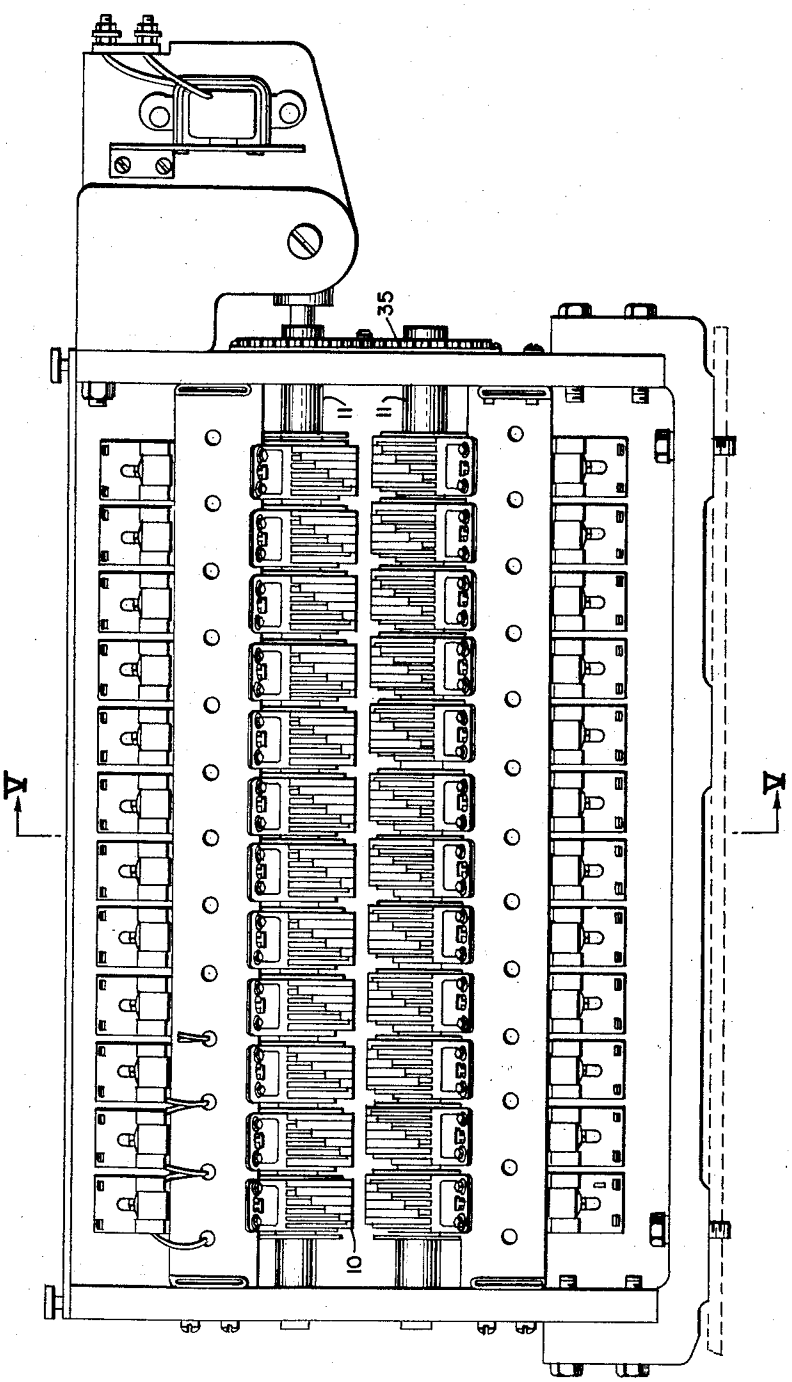
FIG. I.
INVENTORS
H. J. Klotz
V. L. Hudson
BY
ATTORNEY March 24, 1959 H. J. KLOTZ ET AL 2,879,331

DECODING ANALYZER

Filed May 19, 1955 5 Sheets-Sheet 2

INVENTORS
H. J. Klotz
V. L. Hudson

BY

[signature]
ATTORNEY

INVENTORS
H. J. Klotz
V. L. Hudson
BY
ATTORNEY

DECODING ANALYZER

Filed May 19, 1955

INVENTORS
H. J. Klotz
V. L. Hudson
BY
ATTORNEY

March 24, 1959 H. J. KLOTZ ET AL 2,879,331

DECODING ANALYZER

Filed May 19, 1955 5 Sheets-Sheet 5

INVENTORS
H. J. Klotz
V. L. Hudson

BY

ATTORNEY

United States Patent Office 2,879,331
Patented Mar. 24, 1959

2,879,331

DECODING ANALYZER

Herman J. Klotz and Vincent L. Hudson, Endicott, N.Y., assignors to International Business Machines Corporation, New York, N.Y., a corporation of New York Application May 19, 1955, Serial No. 509,644

7 Claims. (Cl. 178—26)

This invention relates generally to converting or translating codes and, more particularly, to means and apparatus for converting a binary code into another code form.

There are a number of business machine record card codes in use. It is valuable to be able to translate the information from a set of cards, made up according to one of these codes, into a set of cards carrying another of these business machines codes. It may be desirable to convert a binary code to a decimal code. For example, it is often of advantage to convert the information on a set of tickets carrying information according to the binary code into the decimal code.

It is an object of this invention to provide a mechanism which accepts coded information from a source record card and converts it into an output of a different business machine code.

It is another object of this invention to provide a means which, responding to the actuation of coded information from a source ticket, translates the coded information into output information pulses which are punched or otherwise inscribed on a record card in a different code.

A further object of this invention is to provide a cam device and cam followers cooperating with the cam device capable of being controlled by one code to produce a second code and thus effect the translation.

A still further object of this invention is to provide means for translating data from one code to another by moving cam followers on a cam under the influence of a binary series of impulses and producing a subsequent sequential output in a different code by means of the cam following action of the followers so controlled.

It is an object of this invention to provide a decoding apparatus which senses the information in a binary code, converts this information into a decimal code, and records the converted information on a tabulating card.

These and other objects of this invention will become more apparent upon consideration of the following drawings, in which:

Figure 1 is a front elevation of the code translating apparatus of this invention showing two rows of the code translating members with drive means for rotating the members;

In converting coded information from one card code to another, it is imperative that the signal of translation be produced and transmitted only when the original code calls for such conversion or translation. This invention provides an apparatus which produces a translation signal only when the existence of such information for translation has been set up by a preliminary action. To produce this result, this invention provides a cam and cam follower combination which receives information from the original code and is set up to translate the information into a second code.

In general, this invention is directed to the conversion of information from an antecedent code to a consequent code by an apparatus which operates to initially sense the character of the antecedent code in bits from an information code-carrying element and to produce said information bits in some form, such as electrical pulses, which can be impressed on a second means, such as an electromagnet. The second means, in turn, cooperates with several components to translate the antecedent code to a subsequent code. These components include a member which has surfaces which are correlative to the elements of the original or antecedent code and also elements which are correlative to the elements of the second or consequent code. The components also include a cam follower which senses the surfaces which are correlative to both codes. The cam followers preconditioned by the antecedent code then control the mechanism to produce the consequent code. An intermediate component is provided which is operated by both the second means at input time and by the cooperation of the cam and the cam follower during the output time. This intermediate component, in turn, operates an output means. The characters in the consequent code output correspond to the original characters from the antecedent code, so that the antecedent code becomes translated to the consequent code.

More specifically, the apparatus and method of this invention provides the cyclic conversion of information from successive information sources during which the input information is read sequentially into the conversion device as a plurality of pulses, during one portion of the cycle. The information is then converted into one readout pulse in an output portion of the cycle.

For the purpose of this description, this invention is described as embodied in mechanism for the conversion of the binary code into a comparable Hollerith form.

Figure 3:
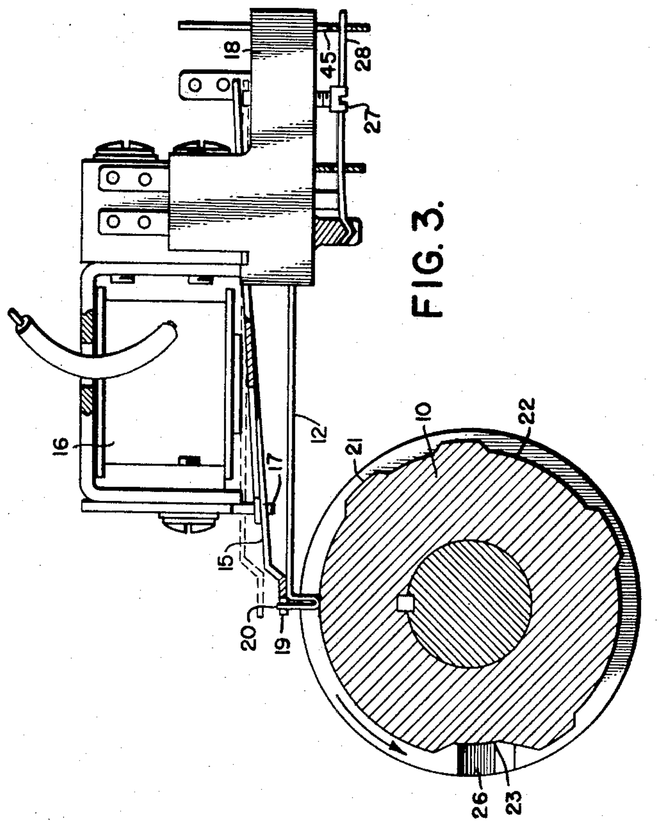
Fig. 3 is a sectional view taken on the line III—III of Figure 2.
Figure 4:
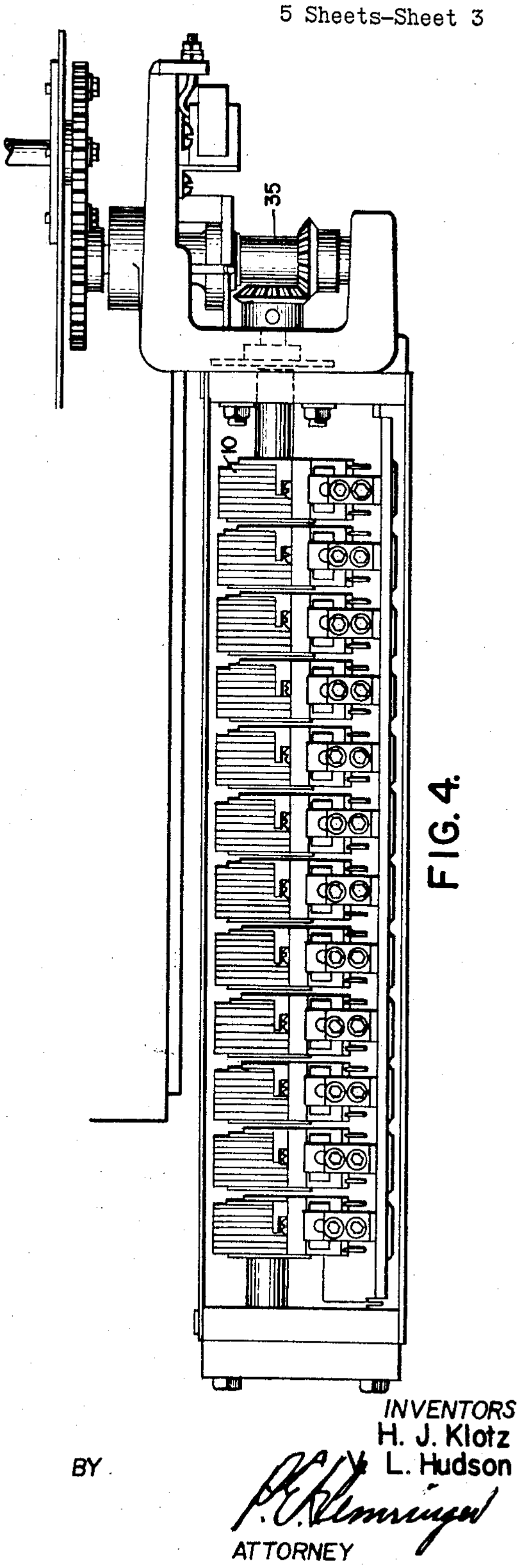
Fig. 4 is a top plan view of the apparatus of Fig. 1 showing a row of twelve of the code translating members with drive means therefor.
Figure 5:
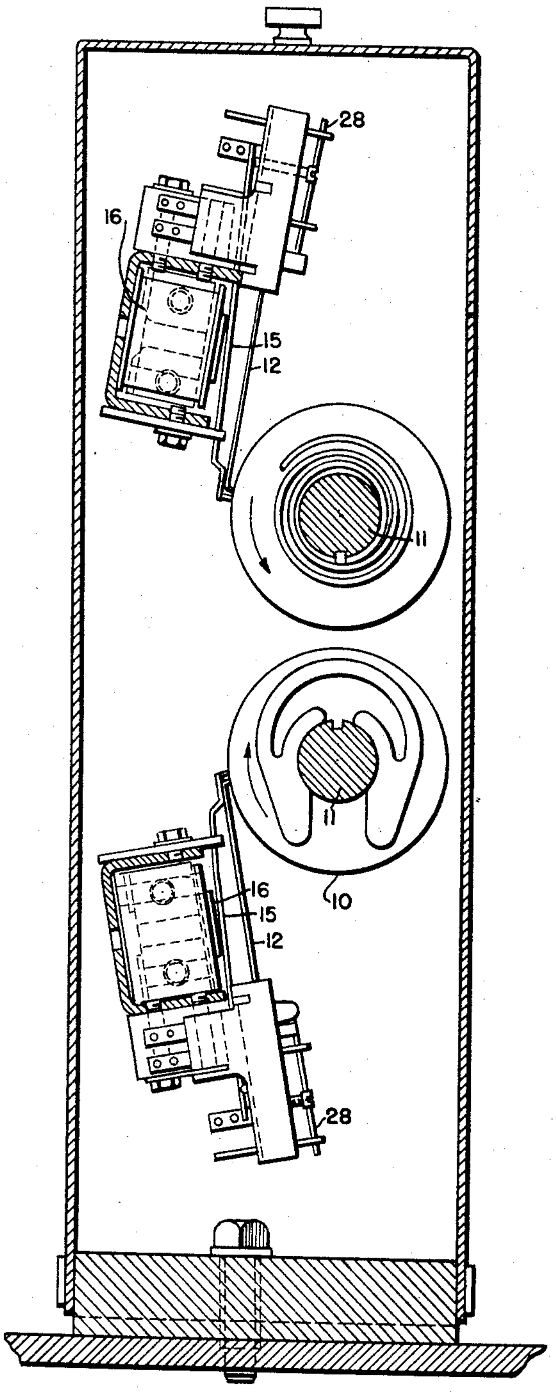
Fig. 5 is a sectional view taken on the line V—V of Fig. 1.

The translating apparatus of the embodiment of this invention described herein uses twenty-four cams for translating twenty-four columns of data from one code to the other. As shown in Fig. 1, cams 10 are mounted on axles 11, in two rows, one above the other. Each of the cams 10 is formed to receive information in one code and cooperate with means for translating the information into another code. The cams 10 are shown in greater detail in a front elevation in Fig. 2, and a side sectional view in Fig. 3. Fig. 3 shows code wires 12, each of which acts as a cam follower riding in one of the five pairs of grooves 13 and 14. The grooves 13 are referred to as the setup grooves and the grooves 14 are the non-setup grooves. The side sectional view of Fig. 3 shows the relationship between the code wires 12 and an armature 15, which is actuatable by an electromagnet 16. Fig. 4 is a top view of the apparatus showing the top row of cams 10 and a drive gearing 35 for rotating the axle 11. Fig. 5, in a side sectional view of the apparatus of Fig. 1, shows the relationship between the respective code wires 12, armature 15 and electromagnets 16 for the respective cams 10 in the two banks of cams.

Figure 2:
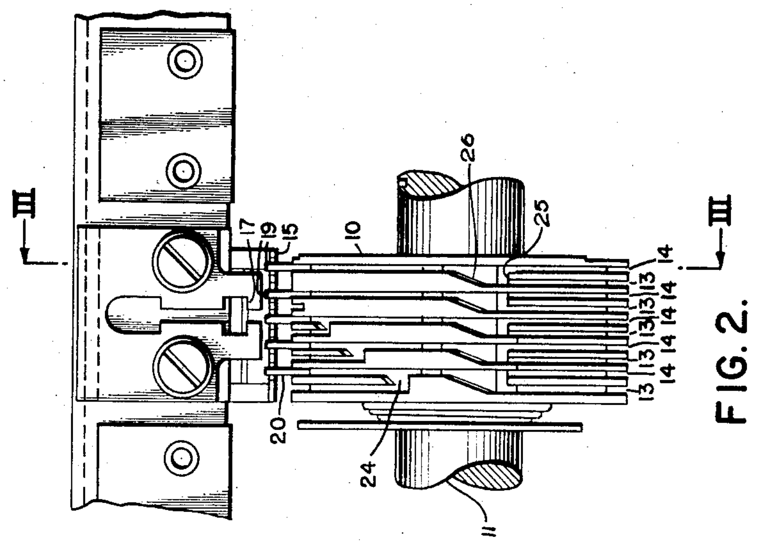
Fig. 2 is an enlarged front elevational view of one of the code translating cams together with associated cam followers.

In Fig. 2, the ten grooves 13 and 14 represent five pairs of setup and non-setup grooves. Each of these pairs cooperates with one of the five code wires 12. As shown in Fig. 3, the code wires are mounted in a phenolic molded base 18. The wires 12 are mounted in the base 18 with relationship to their respective cam 10, so as to be under a spring bias, both axially of the cam 10 and radially of the cam 10. The radial bias of each of the code wires 12 tends to press the code wires 12 into contact with the periphery of the cam 10. The axial bias on the code wires 12 tends to move the code wires 12 to the left, as seen in Fig. 2. Thus, the spring bias on the code wires 12 tends to force the code wires from their related non-setup grooves 14 to their related setup grooves 13. The armature 15 is provided with tines 19 to form a fork-like structure at the outer end of the armature 15. As seen in Fig. 3, each code wire 12 has an upward extending prong 20 which extends between adjacent armature tines 19, as shown in Fig. 2.

Each groove 13 or 14 of the cam 10 is provided with cam surfaces which may be divided into sloping surfaces and three levels of dwell surfaces. The code wires 12, in riding in the grooves 13, are moved radially of the cam upon following the contour of the various surfaces in the grooves 13 and 14. Code wires moved outwardly by the cams move the armature 15 which contacts the code wires 12 and the code wires 12 also move with relation to the armature 15. As shown in Fig. 3, the cam 10 has outer dwells 21, middle dwells 22 and an inner dwell 23. The outer dwells 21 hold the code wires 12 in an outmost radial position and move the armature 15 with the code wires 12. The middle dwells 22 hold the code wires 12 in engagement with the armature 15 and allow the armature 15 to assume the position shown in full lines in Fig. 3. The inner dwells 23, however, permit the code wires 12 to move radially inward of the cam 10 to an extent at which the prongs 20 move out of engagement with their related tines 19. The armature 15, also may be actuated by energization of the electromagnet 16 and when thus actuated lifted away from the cam 10 into the armature position shown in dotted lines.

The respective grooves 13 and 14 each of the five pairs of grooves are interconnected by two slots. One of these slots for each of the groove pairs is a setup slot 24, and the other is a reset slot 25, as seen in Fig. 2. The setup slot between each pair of grooves is provided to permit the respective code wire 12 to move from the respective non-setup groove 14 into the respective setup groove 13 as the code wire 12 passes its respective setup slot 24 in the rotation of the cam 10. The reset slot 25 is provided to return the code wire 12 from the setup groove 13 to the non-setup groove 14. The action of the reset slots 25 is employed only on those code wires 12 which are in the respective setup grooves 13, as the cam rotates.

Each of the code wires 12, as stated, are spring biased to bear to the left, as seen in Fig. 2. The wires thus have a tendency to move into the setup grooves 13 as they are passed by the setup slots 24. When the armature 15 is in its normal lower position, as shown in Figs. 2 and 3, tines 19 at the outer end of the armature 15 engage the wires and prevent their natural lateral movement through the respective slots 24 when the slots 24 pass by the code wire tips in the rotation of the cam 10. The armature 15 for each of the cams 10 can be raised by the energization of its respective electromagnet 16. As shown by the dotted lines in Fig. 3, when the armature 15 is raised by its electromagnet, its respective code wires 12 are free of the respective tines 19 and the code wires 12 are, therefore, free to submit to the urging of their normal spring bias and move axially through their respective setup slots 24 when the setup slots 24 pass the respective code wires 12 during the rotation of the cam.

The setup slots 24 are arranged in staggered relation such that they will allow their respective code wires 12 to transfer from their respective non-setup tracks of the grooves 14 to the setup tracks of the grooves 13 in serial order. If the armature 15 is elevated by its electromagnet 16 at a point in the rotation of the cam 10 as a setup slot 24 passes its code wire 12, the code wire 12 will shift from its non-setup groove 14 to its setup groove 13 under normal spring bias. Conversely, each of the pairs of grooves 13 and 14 has a common restoring abutment 26 associated with its respective reset slot 25. The restoring abutment 26 returns at the end of the read-out phase, those code wires 12 which were permitted to shift into the setup grooves 13.

The inner dwell 23 is positioned in each of the grooves 13 and 14 at the respective reset slot 25. As seen in Fig. 3, the inner dwell 23 is positioned so that the abutment 26 contacts the code wires 12 when they are moved radially inward of the cam 10 by following the inner dwell 23. When the code wires 12 are dropped down on the inner dwell 23, the prongs 20 are removed from engagement with their respective tines 19. This is so because the armature 15 is spring urged to lie against the armature stop 17 and thus remains in the lower position, shown in Fig. 3 in full lines. Thus, when the inner dwell 23 of the cam 10, shown in Fig. 3, is moved to the code wires 12 by the normal counterclockwise rotation of the cam 10, the code wires 12 will drop downwardly, as seen in Fig. 3, to free the prongs 20 from their adjacent tines 19. Thus, the code wires 12 may move axially of the cam 10 without the necessity of raising the armature 15 to disengage the prongs 20.

The armatures 15 are pivotally mounted on or adjacent to the base 18 and are spring biased by a light spring pressure to the position shown in Fig. 3. The armature 15 normally rests just above the code wires 12. In following the code wires 12, the armature 15 moves up and down or in and out with respect to the radius of cam 10. It will be understood that the armature 15 is also actuated by the energization of electromagnet 16. When the electromagnet 16 is de-energized, the armature is governed in its position by the radial outermost of the five code wires 12 in their following of their cam surfaces of the cam 10. At its opposite end from the cam 10, the armature for each cam abuts a pin 27. The pin 27, in turn, engages a contact wire 28. The contact wire 28 makes or breaks connection with a contact blade 45 by the motion of the pin 27 which, in turn, as stated, is governed by the tilting of the armature 15 in following the action of the code wires 12.

Referring to the showing in Fig. 3, as representative of the action of one code wire 12 with one cam 10, it will be seen that as the code wire 12 is moved outwardly of the cam and held in the radial outward position by an outer dwell 21, the armature 15 will be tilted with the cam end being lifted upwardly as seen in Fig. 3. This action causes the opposite end of the armature 15 to be tilted downward and cause the pin 27 to be depresesd. The depression of the pin 27 is, in turn, transferred to a bending action of the contact wires 28 abutted by the pin 27. Thus, each time the code wire 12 passes over one of the outer dwells 21, the armature 15 is tilted and contact between the contact 28 and blade 45 is broken. Stated otherwise, contact is possible between the contact 28 and blade 45 only when the code wire 12 is not following the outer dwells 21. When the code wire 12 is on one middle dwell 22, the armature 15 and the pin 27 are in the position shown in Fig. 3, and the contact 28 and blade 45 are closed under the normal spring tension of the contact wires 28 abutting the pin 27.

Referring to Fig. 2, it is seen that the armature 15 spans all five of the code wires 12 associated with the cam 10. Each of the code wires 12 may lift the armature 15 with the outward radial movement provided by an outer dwell in the respective grooves 13 or 14. Outward motion of any of the code wires 12 is reflected in a similar motion in the armature 15, causing the tilting action mentioned above. Thus, contact between the contact 28 and blade 45 is possible when all of the code wires 12 are following a middle dwell at the same time. When all of the code wires 12 are on a middle dwell 22, the armature 15 will assume the position shown in Fig. 3, and contact is completed through the contacts 28, as indicated. The cam 10 and the code wires 12, shown in Figs. 2 and 3, are illustrative of the twenty-four cams shown in Fig. 1. Each cam represents a position in the translated codes, and the translated information passes from one code to another in the respective position through these respective cams and their associated apparatus. A position is a column.

The periphery of each of the cams 10, as illustrated in Fig. 3, consists of five pairs of grooves 13 and 14 with one code wire 12 for each pair of grooves and one electromagnet 16 for each cam 10 controlling one armature 15. Each armature 15 cooperates with a contact 28, as described above. In the rotation of the respective cams through the time cycles of the read-out phase of operation, the respective code wires 12 and armature 15 cooperates to break the circuit at contact 28, at those time cycles where no output signal is to be delivered. At those time cycles, when an output signal is to be delivered, the cooperation between wires 12 and the armature 15 permits the contacts 28 to remain closed.

Fig. 3 shows an embodiment of this invention as applied to the surface of one of the cams 10. Translation of information from a binary code to a decimal code is assumed for the purpose of this description. The surfaces of the periphery of the cams 10 in this embodiment are correlative to either the binary code which is the antecedent code, or the decimal code which is the consequent code. The binary code selected for this embodiment is a two out of five bit code in which the elements are "check," "7," "4," "2," and "1," which combine to make up the transmitted characters. The decimal code is a conventional business machine code suitable for punching into a record card in a manner described in greater detail below. The decimal code is read out of the apparatus of the embodiment at cycle points ranging from zero to nine time.

Figure 8:
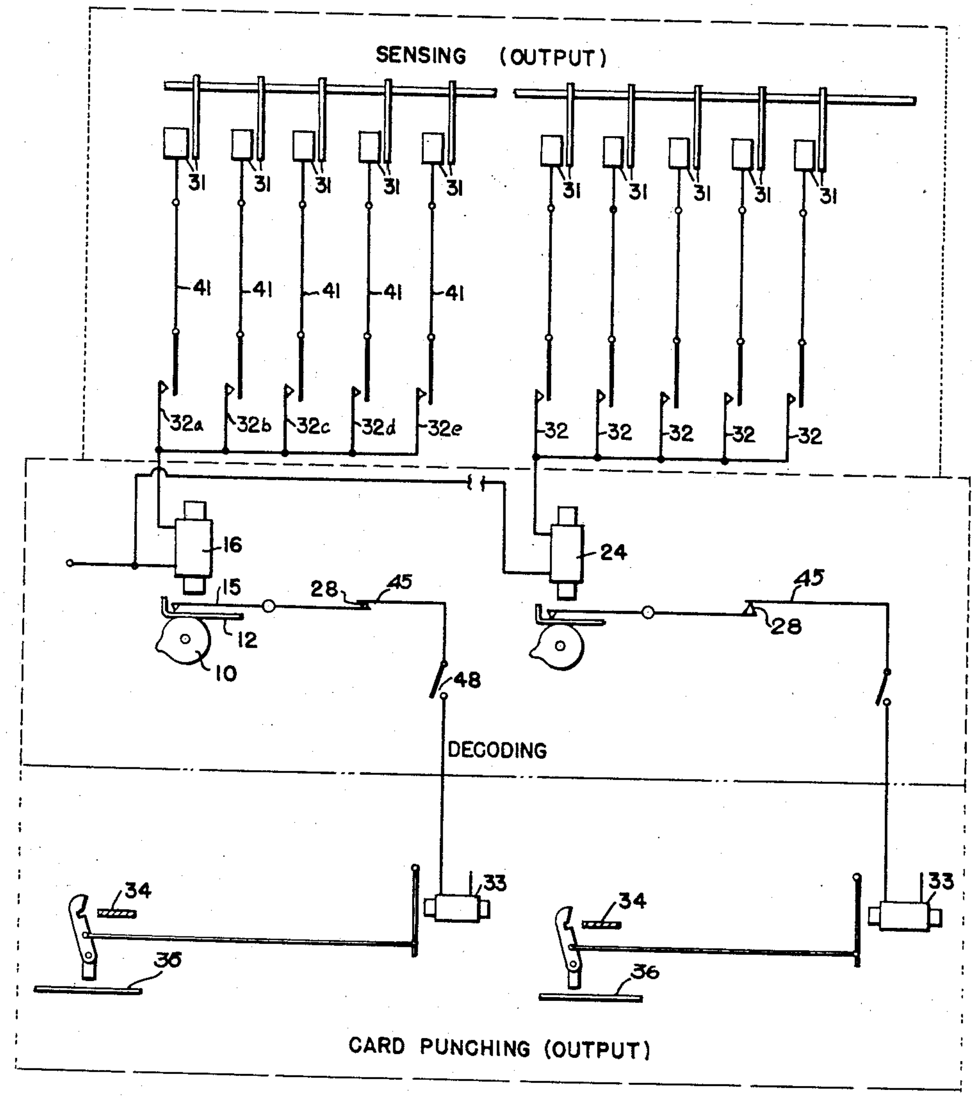
Fig. 8 is a diagram of the sensing and translating circuits in the apparatus of this invention.

A representative embodiment of this invention comprises three general sections as indicated in the diagram of Fig. 8. The upper section within the dotted lines is referred to in this description as the sensing apparatus 29. The middle section within the dash lines represents the decoding unit and the lower section within the dotted lines represents the output or card punching unit.

Figure 6:
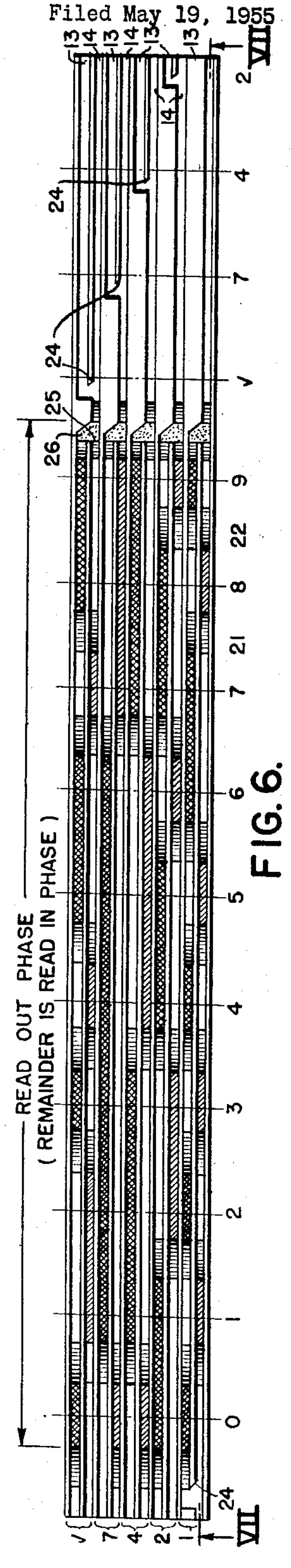
Fig. 6 is a development of the cam periphery of the code translating member of the embodiment.

Viewing a cam periphery, as shown in Fig. 6, the ten time cycle points zero through nine, constituting the read-out phase are indicated at the left, and the four cycles constituting the read-in phase are shown at the right. The reading in of the "2" out of "5" bits of information from a binary source in the sensing apparatus 29 and its respective cam 10 must be accomplished during the allotted time span of the read-in phase. A portion of the end of the read-out phase is the reset time for wires 12. At this time, the wires 12, which have followed a setup groove, are returned to a normal non-setup groove. This occurs directly after the "9" cam lobe termination. The numerals at the lower side of Fig. 6 in the read-out phase indicate the sequence of the decimal cam divisions of the cam surfaces. The "check," "7," "4," "2" and "1" designation at the right end of Fig. 6 indicates the binary relationship of the respective grooves. In the rotation of the cams 10, the motion of the cam periphery, as seen in Fig. 6, is from right to left of the figure.

The setup slots 24 are staggered so as to be circumferentially separated on the periphery of the cam 10. As indicated in Fig. 6, the two uppermost grooves 13 and 14 are the setup and non-setup tracks respectively for the "check" element of the binary code. The next two grooves 13 and 14 contain the respective setup and non-setup tracks for the "7" element of the binary code. The next pair of grooves 13 and 14 contain the setup and non-setup tracks for the "4" element and the two lower pair of grooves contain the setup and non-setup tracks, respectively, for the "2" and the "1" elements.

Figure 7:
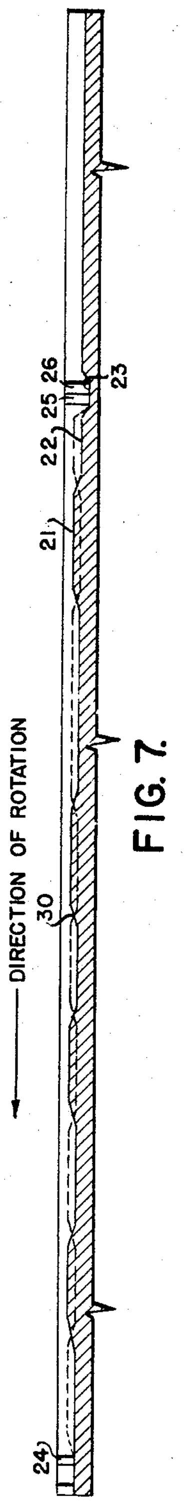
Fig. 7 is a view taken on the line VII—VII of Fig. 6.

The profile of the setup and non-setup tracks in the grooves 13 and 14 is indicated in Figs. 6 and 7. In Fig. 7, a section of the non-setup track of the "1" element shows the various middle dwells 22, the outer dwells 21 and the cam slopes 30 of the "1" element of the binary code. The dwells 21, 22 and 23 of the setup track of groove 13 of the "1" element are shown in dotted lines. The code wire 12 for sensing the "1" element on the cam will follow either one or the other of these profiles, depending upon whether or not the "1" element is set up to indicate a binary number by the respective sensing apparatus 29. In the plan view of Fig. 6, the dwells and slopes are indicated by the variety of shading. The diagonal lines indicate the outer dwells in the non-setup tracks of the respective grooves 14. The cross-hatching indicates the outer dwells in the setup tracks of the respective grooves 13. The vertical lines in the grooves indicate cam slopes and the blank areas in the grooves indicate the middle dwells 22. The dotted areas indicate the inner dwells. Any one of the five code wires 12 riding over an outer dwell 22 will open the contacts 28. These prevent the transmittal of an output pulse, as explained above. Accordingly, it will be seen that it is necessary for all five of the code wires 12 to pass through a middle dwell 22 at the same time for the transmittal of a pulse. The setup and non-setup tracks in the grooves 13 and 14 of the cam periphery are designed such that the code wires 12 are all found in a middle dwell 22 during the passage through only one of the time cycles for each of the ten decimal numbers 0 through 9. Each of the decimal numbers 0 through 9 has a corresponding time cycle in the read-out phase of the cam periphery. The code wires 12, when indicating a given number, are found in their common middle dwell 22 during this respective time cycle for said given decimal number.

In the rotation of a cam 10 of this invention, the cam moves in a direction so that the code wires 12, in effect, traverse the grooves 13 and 14 in a left to right direction as shown in Fig. 6. Starting with the traversing of the cam periphery at the close of nine time, the code wires 12 first encounter the restoring abutments 26. Those code wires 12 riding in the grooves 13 are cammed back to their respective grooves 14. There is an inner dwell 23 adjacent the abutment 26 which cams the code wires back to the non-setup tracks. When thus restored to the grooves 14, the code wires 12 are prepared for a new conversion operation and the previous conversion operation is complete.

The binary code is transmitted to the translating apparatus consisting of the cam 10, the code wires 12 and the armature 15 with its contact 28. The binary character is transmitted to this translating assembly through the electromagnet 16. The binary character is transmitted by electrical pulses which will energize the electromagnet. The binary character is transmitted to the translating assembly during the read-in or setup phase of the cam rotation, which phase contains the read-in cycles. The input of binary characters, during the input phase, is accomplished by energizing the electromagnet 16 in a time relationship with the movement of the cam surfaces. The setup slots 24 are staggered so that one is positioned in each of the five read-in time cycles for the elements of the binary code of this embodiment. As a code wire 12 is in registration with its setup slot 24, it is restrained from snapping into the setup groove 13 only by engagement with its related tine 19. Accordingly, it will be seen that if the electromagnet 16 is energized to actuate the armature 15 and raise it out of engagement with the code wires 12, the code wire which passes by the setup slot in that particular time cycle, will move over into the setup groove. The other four code wires in the same particular time cycle can not move into their respective setup grooves 13 since they abut the wall separating their respective grooves.

The electromagnet 16 receives two pulses during each input operation. These pulses energize the electromagnet 16 during two separate time cycles of the read-in phase and in each case, the resultant actuation of the armature 15 causes the code wire 12 which is passing the setup slot 24 of the correlated time cycle, to move into its respective groove 13. Thus, two code wires are moved into their respective setup grooves 13 and three code wires are retained in their non-setup grooves 14.

As will be pointed out in greater detail below in connection with Figs. 6 and 7, the resultant action of the code wires 12 in subsequently following the outer dwells 21 and the middle dwell 22 will move the armature 15, so that the contact 28 is closed during only one of the succeeding ten time cycles in the output phase of the particular cam rotation for which the two code wires 12 have been set up.

By the proper arrangement of the dwells 21 and 22, each of the input characters, zero through nine, which is represented by the setting up of elements in the read-in phase, has a corresponding output pulse in the proper output time cycle during the output phase.

Figure 9:
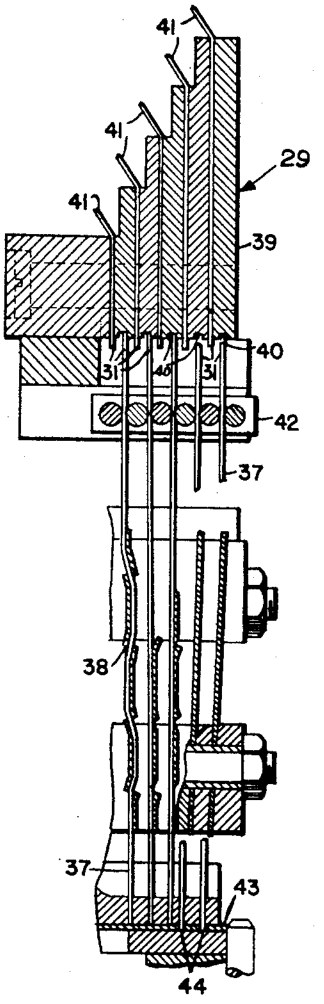
Fig. 9 is a sectional view of wire sensing means for cooperation with the device of this invention.

In the representative embodiment described herein, the information for translation by the translating assembly originates at a wire sensing apparatus in a typical code sensing mechanism, such as shown in Fig. 9 and as described in detail below. The travel of decoded information through the apparatus of this invention can be illustrated by the diagram of Fig. 8. In Fig. 8, the wire sensing apparatus 29 is shown made up of a number of sensing components each having a contact 31 and a switch 32 connected in series. Fig. 8 represents the sensing circuits for two characters, the others being eliminated for the sake of brevity and simplicity. The closing of the contacts 31 and the switches 32 will energize the electromagnet 16.

In the apparatus of this embodiment, there are twenty-four column positions. Each of these column positions has paired contacts 28 and blade 45 which pass a translated signal to a respective punch magnet 33 and an accompanying reproducer unit 34, as shown in Fig. 8. A switch 48 is interposed in each circuit between the blade 45 and the punch magnet 33. Two reproducer units 34 are shown in Fig. 8. The punch mechanisms of the punch magnets 33 are conventional card punch mechanisms which punch sequentially row-by-row. A decimal code business machine card 36 is fed into the reproducer units 34 with a 12-edge first for receiving the output information. The card is indexed across the reproducer units 34 a time cycle for each row. A record card for carrying the input binary code is also indexed for sensing at the wire contacts 31, column-by-column. As an output card 36 passes through a reproducer unit 34 data translated from the binary card is recorded on the card 36. Each of the columns on the binary cards has a corresponding column on the decimal code card 36. The punching mechanisms, in effect, scan the decimal card 36 row-by-row after the information from the binary card has been set up on the cam 10. The decimal card 36 is scanned by the reproducer unit 34 during the read-out phase in the rotation of the cams 10. The information from the binary record card is set up on the cams 10 during the read-in phase of the cam rotation cycle. Thus, a character which is detected in the binary code, by the wire sensing apparatus is set up by means of its elements on its respective cam 10 during the read-in phase. The corresponding character is read-out as a pulse during the proper time cycle in the read-out phase.

As the cams 10 move through the read-out phase, the decimal card 36 will be indexed row-by-row in synchronism with the rotation of the cams through the corresponding time cycles of the read-out phase, ranging from 0 to 9, as shown in Fig. 6. As the cams 10 rotate past 0 time cycle, the decimal card 36 is indexed into and out of the 0 row. As the cams 10 rotate through 1 time cycle, the decimal card 36 is indexed into and out of the 1 row. The continued rotation of the cams 10 and indexing of the decimal card 36 moves these components through the remainder of the time cycle range to 9 time. If the respective cams are setup to translate information in any particular time cycle, a pulse will be transmitted to their respective punch magnet 33 of the reproducer unit 34 as the card 36 indexes to the corresponding row.

The output pulse from any one of the translating assemblies is the product of the action of the respective code wire groups in following their related cam surface. The following description sets forth an example of the operation of a representative cam 10 and its associated components. It will be understood that the switches 32 shown in Fig. 8 must close sequentially to provide the stepped read-in pulses which occur in time with the movement of the setup slots 24 past the code wire tips. Since the wire sensing contacts 31 of Fig. 8 are all set up and closed at a common time, the sequential closing of switches 32 is the means for differentiating timewise between the various antecedent code bits to effect successive operation of magnet 16.

At the inception of a cam rotation cycle, the code wires are traversing the non-setup tracks 14 and enter "check" time cycle as shown in Fig. 6. Concomitantly, switch 32*a* is closed to transmit a pulse from the contacts 31 for the binary code "check" position, if the contacts are closed to indicate the existence of a "check" element. The transmission of a pulse to the electromagnet 16 lifts the armature 15 as the setup slot 24 of the check bit passes the check bit code wire 12 during the check time cycle. The check bit code wire 12 will spring from its non-setup groove 14 to its setup groove 13, through setup slot 24, and follow its setup track during the subsequent read-out phase. As the cam 10 continues to rotate and the code wires 12 continue to follow their respective tracks 14, corresponding pulses from the switches 32*b*, 32*c*, 32*d* or 32*e* will cause the armature 15 to be lifted from the code wires 12 at the proper time in the traverse of the code wires. The switches 32*a*–32*e* are closed sequentially as explained above, and upon closure of any one thereof, a pulse is transmitted if an element of the binary code is sensed. Each column on the binary card has only two perforations, unless faulty; accordingly, only two code wires 12 will be shifted into their respective setup grooves 13 during the read-in phase. The remaining three wires 12 will be in their respective grooves 14 following their non-setup tracks.

As pointed out above, during the read-out phase, the cam 10 turns in synchronism with the row-by-row indexing of the card 36. Ten rows of the card are sequentially presented to the conversion unit 34 in synchronism with the traversing of the corresponding time cycles in the read-out phase across the code wires 12. The 0 time cycle and the 0 row are first scanned by the code wires 12 and reproducer unit 34.

The binary character for 0 is a combination of the element "7" and "4." If the reproducer unit 34 for the particular cam 10 is to read as 0 from the cam 10, all of the code wires 12 must be in a middle dwell 22 as they traverse across 0 time. An examination of the profile of the cam periphery, as shown in Fig. 6, will show that if the code wires 12 are properly set up, a pulse will be transmitted to the punch magnet at 0 time. The "check" code wire will be in its non-setup groove 14 and in a middle dwell 22. The "7" code wire will be in its setup groove 13 and in a middle dwell 22. The "4" code wire will be in its setup groove 13 and in a middle dwell 22. A "2" code wire will be in its non-setup groove 14 and in a middle dwell 22. The "1" code wire 12 will be in its non-setup groove 14 and in a middle dwell 22. The contacts 28 will, therefore, be closed by the action of the code wires concurrently following five middle dwells, and a pulse will be transmitted to the punch magnet 33 through a switch 32 which is synchronously closed. The actuation of the punch magnet 33 will operate the respective reproducer unit 34 to complete the translation of the information to a decimal 0 character. In the subsequent traversing of the cam periphery during the remainder of the same read-out phase, the code wires will not all be found concurrently in the middle dwell. Consequently, no further pulse will be transmitted through the contacts 28 during that part of the read-out phase. After the code wires 12 pass the 9 time cycle, the conversion operation is completed and the camming action of the restoring abutments 26 on the "7" and "4" code wires clears the translating assembly for a conversion operation on the next sequential information.

The operation of each of the code converting units for each column is identical with the above-noted description. As the binary and decimal cards are sequentially presented to the sensing apparatus 29 and the reproducer mechanism 34, the device of this invention serves to first extract from the binary card the code information for each of its respective columns. This binary information is temporarily stored in the closed contacts 31 for the respective columns. The binary information is then read into the cams 10 and subsequently read-out of the cams 10.

The overall cam moving apparatus is shown in Figs. 1, 4 and 5 to illustrate the relative positioning of the cams 10. The cams 10 are mounted in two banks and they are turned by the axles 11, one for each bank. The two axles 11 are synchronized in motion by the gearing 35. The vertical sectional view of Fig. 5 shows the relative position of the two banks of cams 10, their axles 11, and the electromagnet 16 mountings for each of the cam banks. One set of electromagnets 16 are positioned above the upper bank of cams 10, the other set of electromagnets 16 are positioned below the lower bank of cams 10.

Various means may be provided for reading the source document. The contacts 31 in Fig. 9, for example, may be closed in any suitable manner to indicate elements of the binary code. Fig. 9 illustrates a wire sensing means which is adapted to serve as the sensing apparatus 29 of Fig. 8.

The sensing apparatus 29 of Fig. 9 is comprised of five wires 37 arranged to be positionable across the width of a binary record card 43. This is representative of a wire sensing mechanism, composed of twenty-four groups of these five wire units 29. Each set of wires 37 in apparatus 29 represents one of the columns on the card 43. The wires 37 are frictionally threaded through rows of slits formed in a series of five wire carrier strips 38. The wire carriers are suitably supported to hold the wires 37 in position. At the upper end of the wires 37, terminal blocks 39 have notches 40 which normally restrain the upper ends of the wires. As described in copending application, H. J. Klotz, Serial No. 376,929, filed Aug. 27, 1953, the sensing wires 37 are positionable in the perforations 44 in the card 43. The wires 37, shown in Fig. 9, which are not longitudinally displaced by entrance into perforations 44 in the card 43 have their upper ends positioned within the notches 40, whereas the wires 37, sensing the perforations 44, are carried down a sufficient distance to be clear of the notches 40. Terminal wires 41 project slightly from the underside of the terminal block 39 such that a terminal wire is adjacent each of the sensing wires 37. The upper ends of the sensing wires 37 and the lower ends of the terminal wires 41 form the electrical contacts 31, shown in Fig. 8. The terminal wire 41 is connected through its respective switch 32 to its respective electromagnet 16. The displaced sensing wires 37 may be moved laterally by a carriage 42. This lateral movement causes any of the sensing wires 37 which are withdrawn from their retaining notches 40 to contact their related terminal wires 41 and energize the electromagnets 16 in circuit therewith.

The wires 37 that are not displaced by the perforations 44 in the card 43, still have their contact ends 31 positioned within the notches 40. The lateral displacement of the wires 37 by the carriage 42 does not bring these non-displaced wires 37 into electrical contact with their respective terminal wires 41. In this way, the position of the perforations 44 in the card 43 is transmitted to the electromagnet 16.

Other commonly used means such as brush and contact roll sensing for sequentially energizing the electromagnet 16 with a binary series of impulses may be substituted for the above-described wire sensing means. Wire sensing is the preferred means of sensing for the particular embodiment described.

The apparatus and method of conversion of this invention have been described in connection with an analyzer unit for converting a 2-out-of-5 element code to a decimal code. It will be understood that it is within the spirit of this invention to modify the apparatus so that it could be adapted to any code. The invention may be applied to other translations; decimal for numeric or alphanumeric or alphabetic. The invention may be applied to the translation of any code to any code. Other modifications of the apparatus of the above-described embodiment may be made without departure from the invention. For example, a means for releasing the code wire retaining member may be varied within the scope of the invention. Any means that will release the code wires for setting up at the strategically timed intervals will effectuate the invention. Other modifications of the apparatus which provide for the reading-in of a plurality of bits of information to a cam means and which will convert the information and read it out as one bit or more than one bit of information fall within the purview of the novel concept.

The invention is not restricted to five sets of grooves for the alpha-numeric code. A "6" or more bit code can be used employing six or more pairs of tracks. Also, the output data from the translating assembly may be recorded in various ways. Instead of punching cards, the output pulses might be used to print, to punch a tape, to place information on a magnetic tape and in other ways.

This invention provides an effective means for code conversion. The mechanism of the apparatus is simple and is adapted to available mechanisms to provide the complete conversion unit. It is a feature of this invention that it is self-checking if a consistent original code is employed. For example, the above-described embodiment is inherently self-checking and has two and only two read impulses which will cause a correct setup combination. If incorrect setups result in multiple punching or in no punching at all, the blank column and double punch circuits of a conventional reproducer will be initiated to indicate the error. Thus, the system receives an overall check in each conversion operation.

Having thus described the theory of this invention, and set forth the construction and operation of a preferred embodiment for the purpose of illustration only, the described invention is limited solely by the scope of the appended claims.

What is claimed is:

1. An apparatus for translating information from an antecedent code to a consequent code, comprising in combination sensing means for detecting information bits of said antecedent code, an electromagnet receiving and responding to electrical pulses from said sensing means, a rotatable cam, grooves in said cam comparable to the characteristics of said antecedent code, cam surfaces in said grooves comparable to the characteristics of said consequent code, contact operating means for producing electrical pulses in said consequent code and cam followers integral with said contact operating means for following the grooves and cam surfaces of said cams, said combined contact operating means and cam followers operable by said electromagnet to cooperate with said grooves in conditioning said cam followers with said antecedent code information bits, two or more grooves for receiving the respective conditioned followers, each first groove corresponding to an information bit of the antecedent code, two or more second grooves for receiving non-conditioned followers, each second groove corresponding to an information bit of the antecedent code, dwells in said first grooves for producing code impulses at the appropriate consequent code time intervals, and dwells in said second grooves for producing code impulses at the appropriate consequent code time intervals, to produce said consequent code electrical impulses upon further rotation of said cam.

2. An apparatus for translating information from an antecedent code to comparable information in a consequent code comprising, in combination, sensing means for detecting elements of said antecedent code and producing electrical pulses characterisitc of said detected elements, an electromagnet, said electromagnet capable of receiving and responding to said electrical pulses from said sensing means, a rotatable cam having sets of grooves each corresponding to an element of said antecedent code, cam surfaces, said cam surfaces in combination corresponding to the characteristics of said consequent code, a cam follower in each of said groove sets and traversing said cam surfaces, contacts cooperating with said cam followers capable of producing electrical pulses in the elements of said consequent code, said cam followers operable by said electromagnet to cooperate with said sets of grooves under the influence of said antecedent code electrical pulses to condition said cam followers with said antecedent code elements, a first groove in each of said sets of grooves for receiving the respective conditioned cam follower, a second groove in each of said sets of grooves for receiving non-conditioned followers, dwells in said first grooves for producing code impulses in the appropriate consequent code time intervals and dwells in said second grooves for producing code impulses at the appropriate consequent code time intervals, to produce electrical pulses in said consequent code elements by means of said cam surfaces.

3. An apparatus for translating information from an antecedent code to comparable information in a consequent code having, in combination, means responding to and relaying information bits from said antecedent code, an electromagnet, said electromagnet capable of receiving and responding to said antecedent code information bits, a rotatable cam having sets of grooves, each set of grooves corresponding to an element of said antecedent code, cam surfaces, cam followers in said grooves following said cam surfaces and cooperable with the energization of said electromagnet with said information bits, means actuated by the motion of said followers on said cam surfaces producing information in said consequent code in pulses, first dwells of said cam surfaces moving said followers to produce said pulses, second dwells of said cam surfaces moving said followers to interrupt said pulses, said dwells being arranged in groups corresponding to elements of said consequent code whereby the grooves are in synchronism with appropriate time intervals in the tracking of the cam followers on the cam surfaces upon rotation of the cam, a setup groove in each set of grooves and a non-setup groove in each set of grooves, a first dwell at each consequent code element group in the setup groove of the groove set of an element in the antecedent code making up the respective consequent code element and second dwells in the remaining setup grooves of the said consequent code element groove, slots between grooves of each set of grooves to allow the respective cam follower to move from one to the other of the respective grooves and a radially indented cam surface at said slot to allow said cam follower to move radially inward on moving between said respective grooves.

4. A code translating device comprising means for sensing binary code information, electrical contact means for producing information bits of said binary code in the form of sequential electrical pulses, electrically energizable means capable of receiving said sequential electrical information bit pulses, an armature actuated by said electrical energizable means in cooperation therewith, a rotary cam, a set of grooves in said cam for each information bit of said binary code, a cam follower for each of said sets of grooves, said rotary cam being rotatable to move said grooves along said cam followers, projections on said armature cooperable with said followers to retain each of said cam followers in one of their respective grooves, said armature being actuatable by said electrical energizable means to release said cam follower, slots between the grooves of each set of grooves to allow each cam follower to move from one of its respective grooves to the other of its respective grooves, said slots and electrically energizable means being cooperable to condition the cam followers corresponding to electrical information bit pulses of the binary code, a first groove in each of said sets of grooves for receiving the respective conditioned cam follower, a second groove in each of said sets of grooves for receiving non-conditioned cam followers, dwells in said first groove for producing code impulses in the appropriate decimal time intervals and wells in said second grooves for producing the decimal code impulses at the appropriate decimal time interval, and contact means operable by said cam followers for producing electrical pulses in said decimal code and abutments on the surfaces of said cam at some of said slots, said abutments being oblique to the direction of relative travel between said cam follower and said rotary cam to move said cam follower from one of the respective grooves to the other.

5. In an apparatus for translating data from a combinational multi-bit code to a timed single bit decimal statistical code, a rotary drum having in the periphery thereof a plurality of pairs of parallel grooves, each pair of said grooves coresponding to an element of a multi-bit combinational code and being composed of a non-setup groove and an adjacent setup groove, a plurality of equally spaced index point positions along the length of said grooves each corresponding to the single index point position of a timed decimal statistical code, cam surfaces consisting of alternate high and low dwells in each of said grooves, the cam dwells of said surfaces in the setup grooves of the elements of the combinational code corresponding to the index point equivalent of the decimal code along the length of said grooves and the cam dwells of said surfaces in the non-setup grooves at said same index point positions all being of the same height, a laterally shiftable cam follower normally disposed in each of said non-setup grooves, electrical means for sensing a multi-bit combinational code, means under control of said sensing means for laterally shifting from their non-setup grooves to their setup grooves those of said followers corresponding to the elements of the code being sensed whereby all of said followers are at the same elevation when said drum is rotated to its index point position corresponding to the sensed combinational code, and means responsive to said followers when they are all at the same elevation at any one of said index point positions for transmitting a single output pulse.

6. The invention of claim 5 wherein each of said non-setup grooves is connected to its adjacent setup groove by a slot, said followers are spring biased to enter said setup grooves through said slots, said combinational code sensing means includes means for engaging and normally restraining said followers against said spring bias to retain the same in their respective non-setup grooves, and including means responsive to the reading of the elements of a combinational code for disengaging said engaging means from said followers whereby the same may move into their respective setup grooves when in registration with said slots.

7. The invention of claim 5 wherein each of said non-setup grooves is connected to its adjacent setup groove by one of a series of slots staggered with respect to each other along a length of said grooves, said followers are spring biased to enter said setup grooves through said slots, said combinational code sensing means including means for engaging and normally restraining said followers against their spring bias to retain the same in their respective non-setup grooves, and including means responsive to the reading of the elements of a combinational code for successively disengaging said engaging means from said followers at the slot of each groove corresponding to the elements of the code being sensed whereby the followers corresponding to the elements of the code being sensed may move into their respective setup grooves when in registration with the slots thereof.

References Cited in the file of this patent

UNITED STATES PATENTS

| | | |
|---|---|---|
| 1,880,409 | Bryce | Oct. 4, 1932 |
| 1,916,987 | Peirce | July 4, 1933 |
| 2,705,105 | Paschen | Mar. 29, 1955 |
| 2,741,427 | Drake | Apr. 10, 1956 |